United States Patent
Schoubye et al.

(10) Patent No.: US 9,863,724 B2
(45) Date of Patent: Jan. 9, 2018

(54) SUPPORT FOR A HELICAL COIL INSERTED IN A HEAT EXCHANGER TUBE

(75) Inventors: Peter Schoubye, Hørsholm (DK); Morten Thellefsen, Hillerød (DK)

(73) Assignee: Haldor Topsoe A/S, Lyngby (DK)

(*) Notice: Subject to any disclaimer, the term of this patent is extended or adjusted under 35 U.S.C. 154(b) by 1826 days.

(21) Appl. No.: 13/140,215

(22) PCT Filed: Dec. 1, 2009

(86) PCT No.: PCT/EP2009/008548
§ 371 (c)(1),
(2), (4) Date: Jun. 16, 2011

(87) PCT Pub. No.: WO2010/069461
PCT Pub. Date: Jun. 24, 2010

(65) Prior Publication Data
US 2011/0247793 A1 Oct. 13, 2011

(30) Foreign Application Priority Data
Dec. 19, 2008 (DK) .................................. 2008 01822

(51) Int. Cl.
F28F 13/00 (2006.01)
F28F 21/00 (2006.01)
F28F 1/40 (2006.01)
F28F 13/12 (2006.01)
B01D 5/00 (2006.01)

(52) U.S. Cl.
CPC .............. F28F 21/006 (2013.01); F28F 1/40 (2013.01); F28F 13/12 (2013.01); B01D 5/0063 (2013.01); F28F 2275/12 (2013.01)

(58) Field of Classification Search
CPC . F28F 13/12; F28F 1/40; F28F 13/125; B01D 5/0063
USPC ........... 165/109.1; 138/37, 38; 336/338, 339
See application file for complete search history.

(56) References Cited

U.S. PATENT DOCUMENTS 3,156,544 A * 11/1964 Eck ........................ C10G 9/00
                                                      165/184
6,119,769 A   9/2000 Yu et al.
8,431,196 B2 * 4/2013 Riedl ..................... C03B 23/049
                                                      428/34.1
(Continued)

FOREIGN PATENT DOCUMENTS

DE   10 2008 029 759 B3   11/2009
EP    0 280 612 A1         8/1988
EP    0 718 243 A2         6/1996
(Continued)

OTHER PUBLICATIONS

Laursen, WSA—Meeting Industry Demands, Sep.-Oct. 2007.*
Neveux, FR2320520TRANS (English Translation), Mar. 1977.*
Nakagawa, JPH09292089TRANS (English Translation), Nov. 1997.*

Primary Examiner — Justin Jonaitis
Assistant Examiner — Eric Ruppert
(74) Attorney, Agent, or Firm — Blank Rome LLP

(57) ABSTRACT

A helical coil is supported inside a heat exchanger tube by at least one inside protrusion on the inside wall of the tube, the at least one protrusion supports the helical coil on a contact point of the helical coil against downwards movement in the tube and supports the helical coil on the end point of the helical coil against rotational movement in a first rotational direction relative to the tube.

6 Claims, 2 Drawing Sheets

(56) References Cited

U.S. PATENT DOCUMENTS

Figure 1:
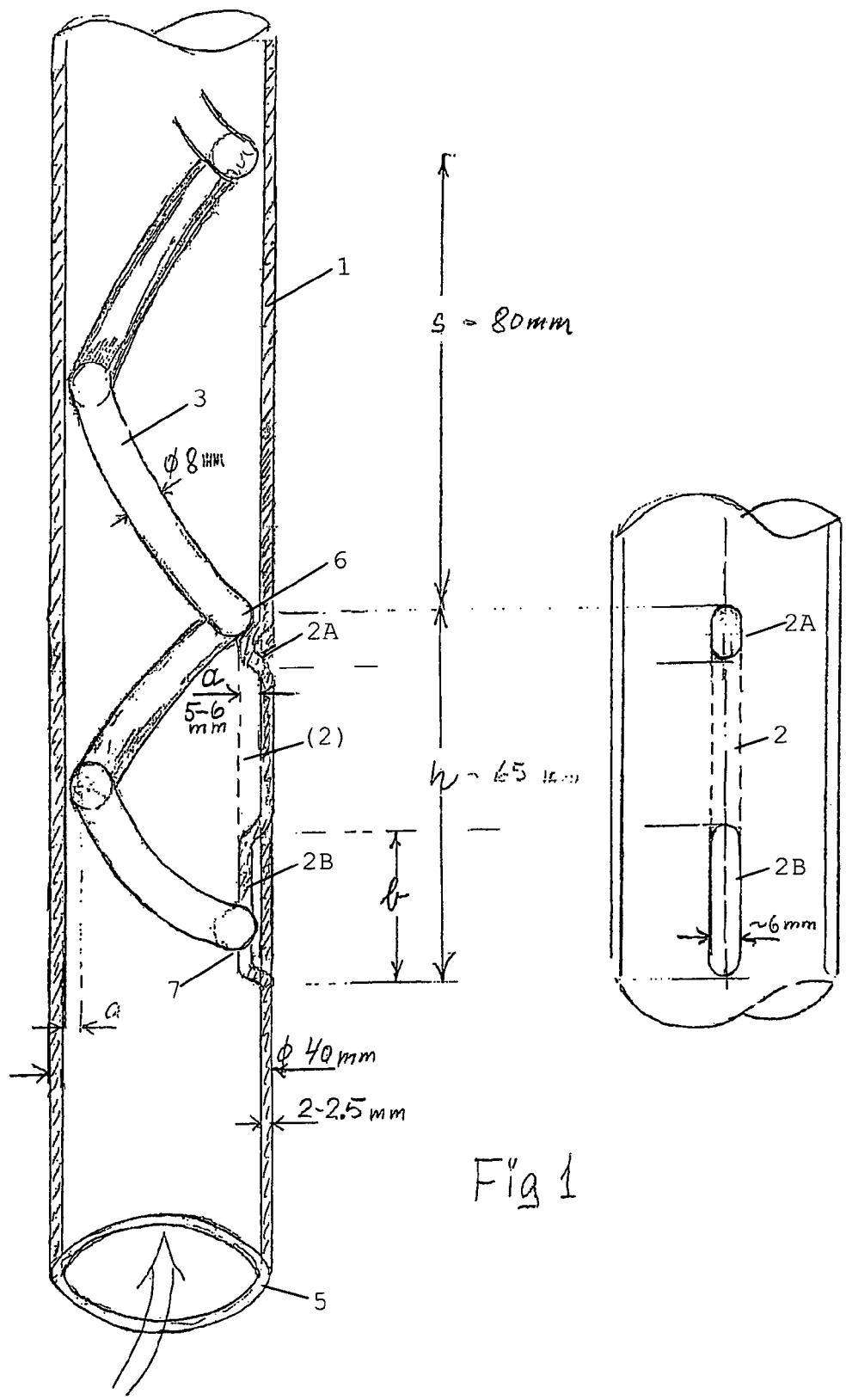

2005/0230094 A1    10/2005    Komatsubara et al.

FOREIGN PATENT DOCUMENTS

| | | | | |
|---|---|---|---|---|
| FR | 2320520 | * | 3/1977 | ............ F28F 13/12 |
| JP | 55-28471 A | | 2/1980 | |
| JP | H09292089 | * | 11/1997 | |
| JP | 2000-179410 A | | 6/2000 | |
| JP | 2001-272193 A | | 10/2001 | |
| JP | 2002-295987 A | | 10/2002 | |
| WO | WO 89/12024 A1 | | 12/1989 | |

* cited by examiner

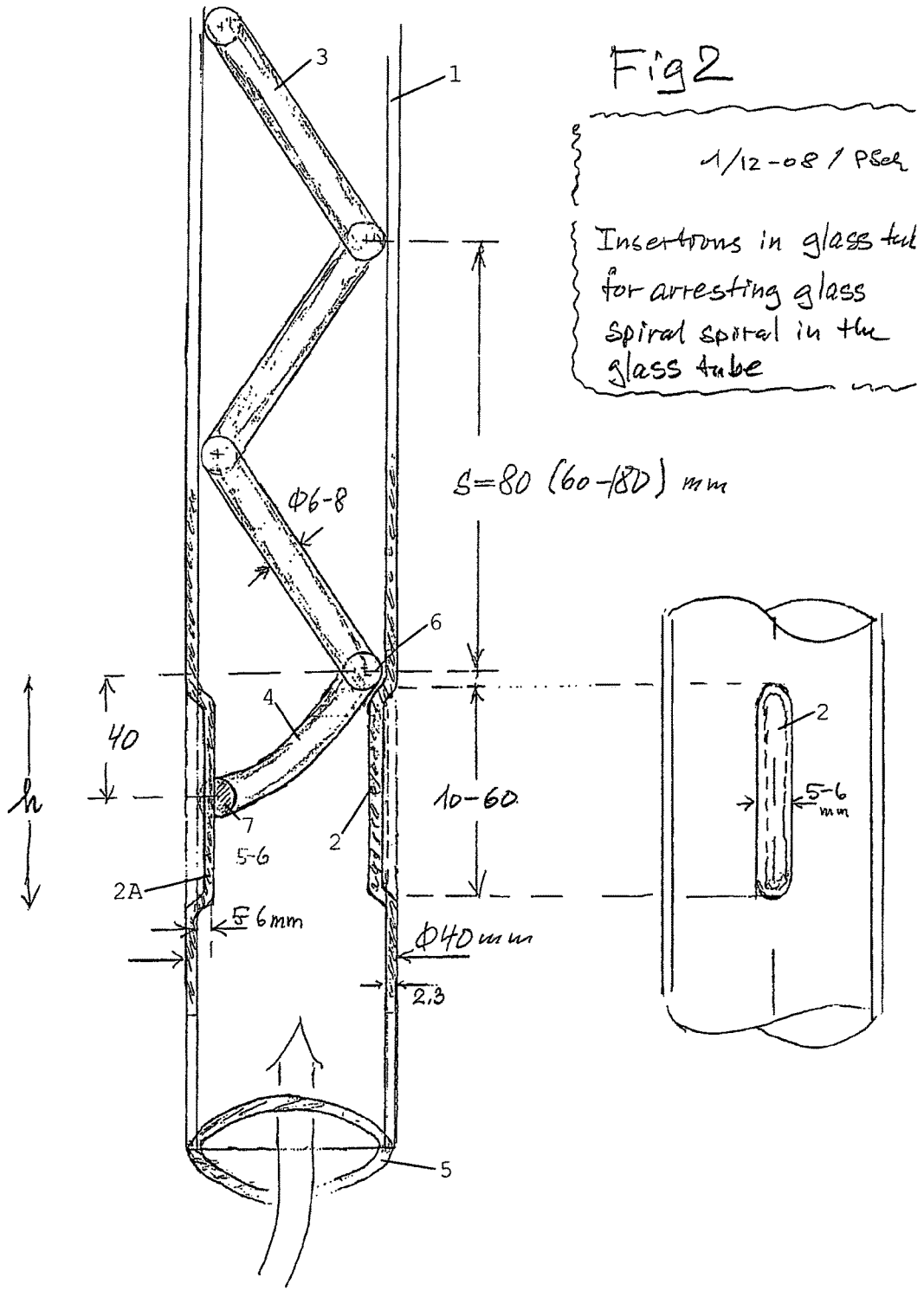

SUPPORT FOR A HELICAL COIL INSERTED IN A HEAT EXCHANGER TUBE

The present invention relates to a new product and method of supporting helical coils in heat exchanger tubes, in particular heat exchanger tubes of falling film condensers, and in particular supporting glass helical coils in the vertical air cooled glass tubes of wet gas sulfuric acid falling film condensers as described in EP 0 417 200. The helical coils are used in order to increase the heat exchange coefficient inside the air cooled glass tubes in which process gas containing $H_2SO_4$ vapour is cooled and sulfuric acid condensed with downflow of the gas in the tubes. Said patent does not mention the material of construction used for the helical coils or how the helical coils are supported in the glass tubes.

WO 2006/021659 discloses a heat exchanger comprising a housing including at least one hollow tubular coil.

EP 0718 243 describes a method to provide a glass tube with an internal glass helical coil by winding a hot glass rod to a helical coil inside a glass tube and fastening said helical coil by merging the glass rod with the glass wall in the line of contact between the helical coil and the wall. Glass tubes with helical coils made by this method meet all requirements of the process of heat exchange and condensation but the method has appeared to be too complicated for large scale production of glass tubes equipped with glass helical coils. GB 1396066 describes another method for fusing glass helical coils to the inner walls of glass tubes which is no more attractive for industrial manufacture of condensing heat exchangers.

The Wet gas Sulfuric Acid process described in EP 0 417 200 has been implemented in a large number of industrial condensers in which sulfuric acid is condensed in vertical glass tubes each tube equipped with an internal helical coil made either as a Ø5-8 mm PTFE tube enforced by steel wire inside the PTFE tube, or as a Ø5-8 mm glass rod winded as helical coil with an external circumference diameter close to the inside diameter of the glass tube and a pitch of 60-160 mm per winding. The steel enforced PTFE helical coil is typically hanging in an eye in the top of the glass tube, while the glass helical coil is typically supported by ending below with a horizontal half or full winding standing on an inside collar made at the bottom end of the glass tube.

The above described methods for supporting such helical coils in glass tubes have been implemented in many industrial plants and described in written material given to customers.

The above described known methods to support helical coils inside glass tubes have the serious draw back that the supporting structure locally causes a flow restriction which increases the pressure drop and prevent the liquid from flowing down across the restriction when the upwards gas flow exceeds certain limits.

In particular the inward collar support for glass helical coil used in state of art industrial wet gas sulfuric acid condensers gives a significant additional pressure drop and limits the maximum possible gas flow rate due to increased tendency to hold up of the out flowing liquid caused by the reduction in open flow cross section area and the increased gas flow turbulence at the bottom end of the tube.

These disadvantages of the present methods to support in particular glass helical coils in glass tubes are avoided by the present invention. Embodiments of the invention are shown in FIGS. 1 and 2, wherein the helical coil is supported by at least one protrusions placed above the bottom end of the tube on the inside of the glass tube.

FIG. 1: Helical coil supported inside a tube with one protrusion.

FIG. 2: Helical coil supported inside a tube with two opposite protrusions.

POSITION NUMBERS OF THE FIGURES

1. Tube
2. Support protrusion
3. Helical coil
4. Lock tail, half winding with small pitch
5. Tube first end
6. Helical coil axial support point
7. Helical coil rotational support point The height (a) of the protrusions is larger than the difference between the internal diameter of the tube and the external circumference diameter of the helical coil. The external circumference diameter of the helical coil is typically 90-100% of the inside diameter of the tube which typically has an inside diameter of 30-50 mm. In one embodiment of the invention, seen in FIG. 1, the same protrusion (2) both supports the helical coil (3) at (6) and stops it from rotating at (7); the protrusion (2) may be split in two sections (2a) and (2b) but they are on the same axial line. In another embodiment seen in FIG. 2, one protrusion (2) supports the helical coil and prevents it from vertical downwards movement while another protrusion (2a), which could be opposite to the other protrusion, blocks the helical coil at (7) from rotating and thereby from moving downwards in the tube.

Replacing the collar at the bottom of the tube with one or two protrusions of the invention and replacing a ring-shaped closing of the helical coil with an open closing with unchanged or only moderately reduced pitch of the lower winding, the pressure drop and the tendency to liquid hold up of the present method of supporting the helical coil is greatly decreased.

With only one protrusion (which may be split in two sections), a full last winding below the point of support (6) is necessary to stop the helical coil from rotating; as the protrusion must be longer than the pitch of the last winding, the length of the protrusion can be reduced by decreasing the pitch of the last winding without increasing the pressure drop or the tendency to liquid hold up as long as the pitch of the last winding exceeds the inside diameter of the tube.

The protrusions in glass tubes are advantageously made as axial indents in the tube walls. From a manufacturing point of view, it is easier to make an indent than a collar in a glass tube and easier just to cut a helical coil with no or a moderate change of pitch than ending a helical coil with a circular winding. The specific measurements of the mentioned embodiments are only examples and as such not limiting the scope of the present invention. A man skilled in the art will be able to produce helical coils supported inside tubes in other dimensions according to the present invention.

Features of the Invention

1. A support for a helical coil inserted into a tube for a heat exchanger, the helical coil and the tube each having a first and a second end, the diameter of the external circumference of the helical coil is equal to or smaller than the inside diameter of the tube, wherein said support comprises at least one protrusion on at least one part of the circumference of the inside wall and near the first end of the tube, with a protrusion height relative to the inside tube wall of said protrusion extending inwards towards the tube centre line, said protrusion height is greater than the difference between the tube inside diameter and the helical coil external circumference diameter.

2. A support according to feature 1, wherein the tube and the helical coil are made of glass or ceramic material, the tube is positioned substantially vertical with the first end in a downwards direction and the glass or ceramic helical coil and the glass or ceramic tube are part of a wet sulphuric acid condenser.

3. A support according to feature 1 or 2, wherein the helical coil external circumference diameter is 90-100% of the inside diameter of the tube.

4. A support according to any of the features 1-3, wherein said support is formed by at least one indent on the outside wall of said tube.

5. A support according to any of the features 1-4, wherein said support comprises one oblong protrusion having a length axis substantially parallel to the centre axis of the tube and a length which is greater than the pitch of the helical coil in the first end of the helical coil supported by said protrusion.

6. A support according to any of the features 1-4, wherein said support comprises a first and a second protrusion located on different parts of the circumference of the inside wall of the tube, whereby the first protrusion supports the helical coil in an axial direction and the second protrusion supports the helical coil in a tangential direction to prevent rotation of the helical coil relative to the tube in a first rotational direction.

7. A support according to any of the preceding features, wherein the inside diameter of said tube is in the range between 10-120 mm, preferably between 30-50 mm, the helical coil is made of a coiled rod, said rod has a diameter of 10-25% of the glass tube inside diameter, the helical coil pitch per winding is in the range of 1-5 times of the inside diameter of the tube, and the protrusion height is 30-90% of the diameter of said rod.

8. A support according to of the preceding features, wherein the inside diameter of said glass or ceramic tube is in the range between 10-120 mm, preferably between 20-70 mm, the external circumference diameter of said glass or ceramic helical coil is in the range between 10-120 mm, preferably between 20-70 mm, the glass or ceramic helical coil is formed by a coiled glass or ceramic rod with a diameter between 2-20 mm, preferably between 4-10 mm, the glass or ceramic helical coil has a pitch between 20-300 mm, preferably between 50-160 mm, the first and second protrusions has a protrusion height/length/width between 1-20 mm/6-300 mm/1-20 mm, preferably between 4-10 mm/20-160 mm/4-10 mm and the first and second protrusions has an axial distance from the first end of said glass or ceramic tube to the end of the first and the second protrusions facing towards the first end of said glass or ceramic tube in the range of 0-4000 mm, preferably between 4-400 mm.

9. A support according to any of the features 6-8, wherein the first and the second protrusions are located on opposite parts of the circumference of the inside wall of the tube relative to the tube centre axis.

10. A support according to any of the features 6-9, wherein the first and the second protrusions are located at the same axial distance from the first end of the tube.

11. A support of a helical coil inserted in an in principle vertical tube for a heat exchanger, wherein said helical coil is supported by one or two protrusions on the inside wall with a height of the protrusions extending inwards towards the centre line of the tube said height being larger than the difference between the internal diameter of the of the tube and the external diameter of the helical coil, one of said protrusions supporting the helical coil and the same or a second protrusion at the lower end of the helical coil stopping it from rotating and thereby moving downwards in the tube.

12. A support according to feature 11, wherein the tube is a glass tube or a ceramic tube, the helical coil is a glass helical coil or a ceramic helical coil with an external circumference diameter being 90-100% of the inside diameter of the glass or ceramic tube, and the protrusions are made in principle as axial indents in the wall of the glass or ceramic tube.

13. A support according to feature 12, wherein the glass or ceramic tube inside diameter is 10-120 mm, preferably 30-50 mm, the helical coil is made of glass or ceramic rod with a diameter of 10-25% of the glass tube inside diameter, the pitch per winding is 1-5 times of the inside diameter of the tube, and the height of the indents intruding into the tube is 30-90% of the diameter of said rod.

14. A support according to any of the features 11-13, wherein the support consists, as seen in FIG. 1, of one single protrusion 2 with a length b in axial direction of the tube where b is larger than the height h of the lower winding 4 of the helical coil 6.

15. A support according to any of the features 11-13, wherein the support consists, as seen in FIG. 2, of two protrusions preferably placed opposite to each other in the tube 1 with the helical coil 3 resting on the protrusion 2 and prevented from rotating by the end of the lower half winding 4 being stopped by the protrusion 2*a* with a length b in axial direction of the tube where b is larger than half of the height h of the lower winding 4 of the helical coil 16. A support according to any of the above features, wherein the tube and the helical coil is part of a wet gas sulfuric acid condenser.

17. Use of a support according to any of the features 1-16 in a wet sulphuric acid condenser.

18. Method of supporting a helical coil inside a tube for a heat exchanger according to any of the features 1-16 comprising the steps of— providing said tube in a substantially upright position with the first end of the tube below the second end of the tube inserting said helical coil first end first into the second end of the tube in a substantial vertical downwards direction until the a part of the helical coil near the first end of the helical coil rests on the at least one protrusion in the tube rotating said helical coil relative to the tube in a first rotating direction which provides for a downwards movement of the helical coil relative to the tube until the first end of the helical coil contacts the at least one protrusion whereby the helical coil is axially and tangentially supported by the at least one protrusion.

The invention claimed is:

1. A wet sulphuric acid condenser heat exchanger, comprising a glass tube having a first open end, a second end, and an inner circumferential wall, a glass helical coil arranged with said tube and having a first end arranged adjacent the first open end of the tube, a second end, and an external circumferential diameter equal to or smaller than an inside diameter of the tube, a plurality of supports for said glass helical coil within said glass tube, said supports preventing at least one of downward movement and rotation of the coil relative to the tube, at least one of said plurality of supports comprising at least one glass tube protrusion, axially spaced from the first coil end and the first open end of the tube, and extending inwardly towards a center line of said tube and upon which said coil rests, said at least one glass tube protrusion having a height greater in dimension than the difference between the tube inside diameter and the helical coil external circumference diameter and a width dimension less than an inner circumference dimension of the glass tube, wherein the glass tube is positioned substantially vertical with the first end in a downwards direction wherein said at least one glass tube protrusion comprises a first and a second protrusion located on different parts of the circumference of the inside wall of the tube, whereby the first protrusion supports the helical coil in an axial direction and the second protrusion supports the helical coil in a tangential direction to prevent rotation of the helical coil relative to the tube in a first rotational direction.

2. A wet sulphuric acid condenser heat exchanger according to claim 1, wherein the helical coil external circumference diameter is at least 90% of the inside diameter of the tube.

3. A wet sulphuric acid condenser heat exchanger according to claim 1, wherein said at least one glass tube protrusion is an inwardly directed indent on an outside wall of said tube.

4. A wet sulphuric acid condenser heat exchanger according to claim 1, wherein the inside diameter of said tube is in the range between 10-120 mm, the helical coil is made of a coiled rod, said rod has a diameter of 10-25% of the glass tube inside diameter, a helical coil pitch per winding is in the range of 1-5 times of the inside diameter of the tube, and the protrusion height is 30-90% of the diameter of said rod.

5. A wet sulphuric acid condenser heat exchanger according to claim 1, wherein the first and the second protrusions are located on opposite parts of the circumference of the inside wall of the tube relative to the tube centre axis.

6. A wet sulphuric acid condenser heat exchanger according to claim 1, wherein the inside diameter of said tube is in the range between 30-50 mm, the helical coil is made of a coiled rod, said rod has a diameter of 10-25% of the glass tube inside diameter, a helical coil pitch per winding is in the range of 1-5 times of the inside diameter of the tube, and the protrusion height is 30-90% of the diameter of said rod.

* * * * *